United States Patent [19]

White

[11] 4,312,107
[45] Jan. 26, 1982

[54] AUTOMATIC ARCUATE BRAKE SHOE RIVETING MACHINE AND METHOD

[75] Inventor: Edward M. White, Milford, Conn.

[73] Assignee: The Milford Rivet & Machine Co., Milford, Conn.

[21] Appl. No.: 106,782

[22] Filed: Dec. 26, 1979

[51] Int. Cl.³ .................... B23P 15/18; B21J 15/14
[52] U.S. Cl. .................... 29/233; 29/243.53; 29/509; 29/522 A
[58] Field of Search ............ 29/509, 522 A, 233, 29/243.52, 243.53

[56] References Cited

U.S. PATENT DOCUMENTS

| | | | |
|---|---|---|---|
| 1,649,503 | 11/1927 | Barber | 29/233 |
| 1,726,354 | 8/1929 | Jessop | 29/233 |
| 1,849,991 | 3/1932 | Pioch | 29/233 |
| 2,677,408 | 5/1954 | Wesstrom | 29/233 |
| 3,241,017 | 3/1966 | Madsen | 318/138 |
| 3,280,395 | 10/1966 | Madsen | 318/138 |
| 3,466,517 | 9/1969 | Leenhouts | 318/603 |

Primary Examiner—Gene P. Crosby
Attorney, Agent, or Firm—Thomas L. Tully

[57] ABSTRACT

An apparatus and method for the loading and locking of brake shoe components of various predetermined sizes in association with dual riveting machines and for automatically applying and upsetting a predetermined number of rivets in predetermined locations in said brake shoe components to form and eject assembled brake shoes in a continuous cycle of automatic operation. The apparatus includes interchangeable and adjustable parts to accommodate the loading and positioning of brake shoe components of various predetermined sizes. The apparatus also includes means for adjusting the operation of the apparatus for the insertion and upsetting of different predetermined numbers of rivets in predetermined different locations of said brake shoe components, depending upon the size and type of brake shoes being produced.

22 Claims, 12 Drawing Figures

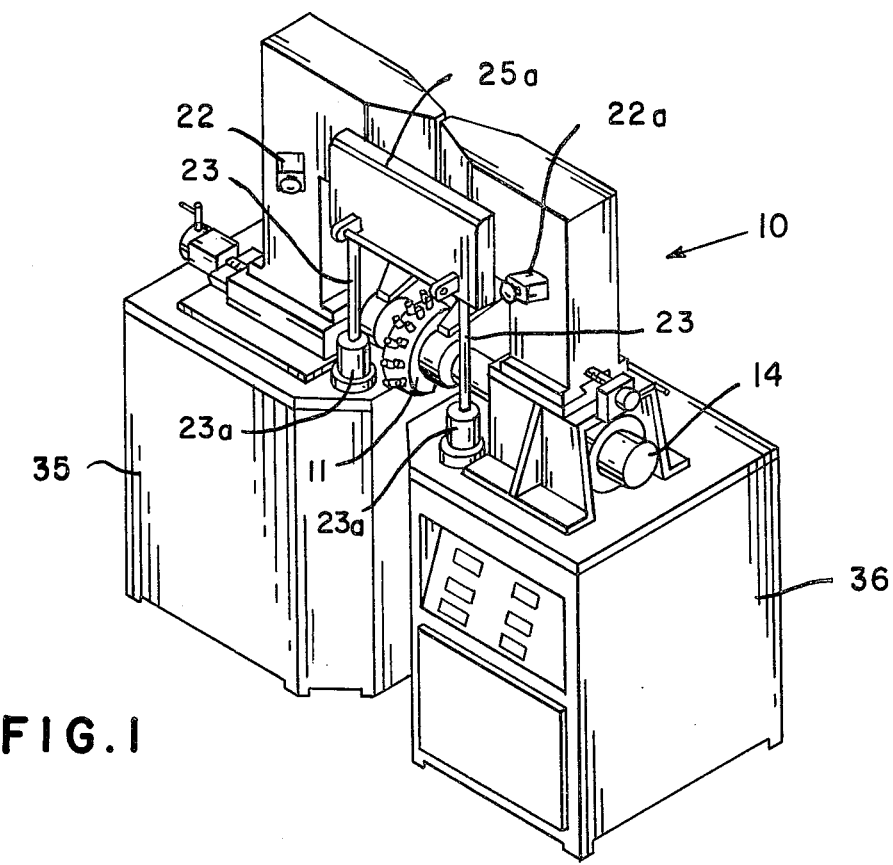
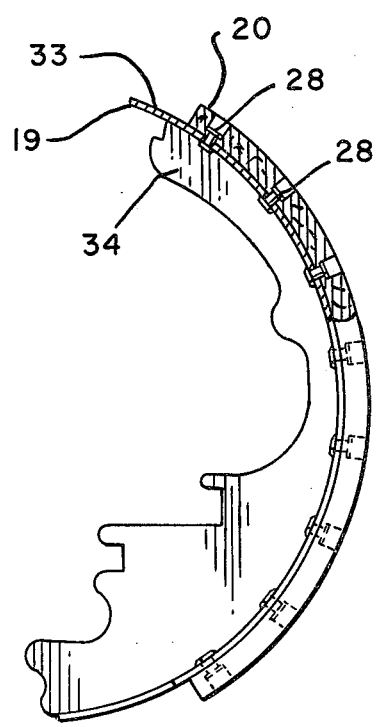
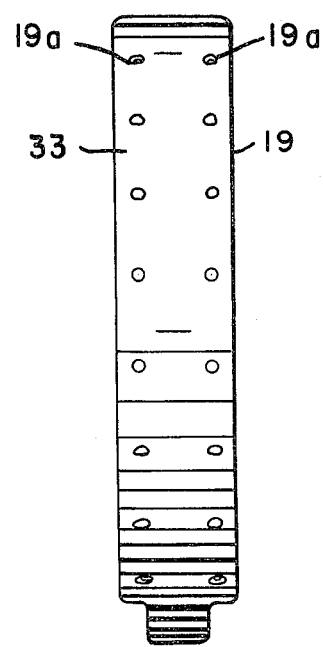
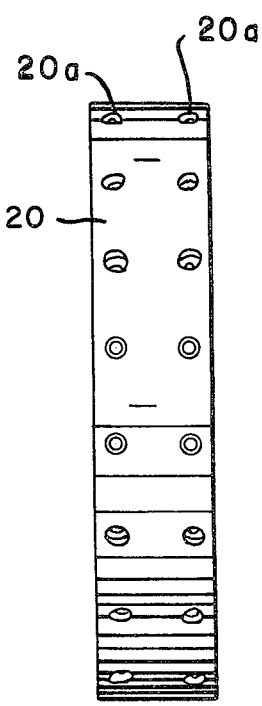
FIG.1
FIG.2
FIG.3
FIG.4

AUTOMATIC ARCUATE BRAKE SHOE RIVETING MACHINE AND METHOD

The present invention relates to an improved, versatile machine designed for safe and efficient automatic operation for the complete assembly of drum-type brake shoes of various sizes from their component parts. Such parts include an arcuate steel backing plate, an arcuate friction pad and rivets which are inserted into aligned holes in said plate and pad and are upset to fasten said components together to form a finished brake shoe. The diameter and arcuate length of said backing plate and pad differ for brake shoes of different predetermined sizes, as does the number and spacing of the aligned holes adapted to receive the rivets.

Drum shoe riveting machines currently in use comprise dual riveting elements, each of which comprises a reciprocating upsetting tool and a fixed backing anvil, the horizontal spacing between the elements being adjustable to adapt the machine for the placement and upsetting of rivets in different brake shoe components of different sizes, the spacing between adjacent rivet holes being different for brake shoes of different sizes. A conventional machine of this type is commercially-available from Milford Rivet & Machine Co. under the designation Model 91.

In use, the operator manually aligns and positions the drum shoe components and places them over the pair of anvil elements so that the single spring-loaded pin present on each of the anvil elements extends through a median adjacent pair of aligned holes of the backing plate and pad components. He then activates the machine to cause the pair of reciprocating tools, each loaded with a rivet, to hammer down against the backing anvils. The spring-loaded pin assists the guidance of the rivet through the aligned holes in the pad and plate and retracts under the pressure of the upsetting tool as the rivet is upset on the top surface of the anvil element against the rear surface of the backing plate to lock the pad and plate together.

This procedure must be repeated manually for each pair of aligned holes in the brake shoe components, the number of pairs varying between about four and eight depending upon the size of the shoes being assembled. Thus, after setting a median pair of rivets, the brake shoe components are lifted off of the pair of anvil pins and repositioned so that the pins extend through the next pair of aligned holes in the direction away from the operator and the rivets are set in those holes. After each pair of aligned holes has been riveted in sequence in said direction, the brake shoe components are removed from the machine, turned around 180° and repositioned for the sequential placement and setting of rivets in the remaining pairs of aligned holes, again starting with the pair of aligned holes next to the median pair originally placed and set.

Obviously, such procedure is tedious, time-consuming, dangerous to the operator who must hold the shoe components in position during the setting operation, and subject to failure due to the possible misalignment of the components during any one of the several repositioning steps involved.

While the above procedure provides a satisfactory brake shoe, it requires the undivided attention of the operator for the entire period required to effect the upsetting of the rivets which, accordingly, limits the quantity of shoes that an operator may produce within a work period. Moreover, as the operator basically sets the duration of the operation, the quantity of brake shoes produced is quite apt to vary over a wide range. These labor factors accordingly have tended to prevent decreasing the cost of an assembled brake shoe.

It is accordingly an object of the present invention to provide a method and apparatus which reduces the duration of an operator's time and attention in assembling a finished brake shoe.

Another object of the present invention is to achieve the above object with a method and apparatus that merely requires an operator to position a friction pad and backing plate on an anvil fixture with the present invention completing the riveting of the brake shoe without the need for manual intervention.

A further object of the present invention is to achieve the above object with a machine that is relatively inexpensive to manufacture with respect to labor savings, is reliable and durable in use.

Yet another object of the present invention, according to a preferred embodiment thereof, is to provide an apparatus of the foregoing type which contains a series of interchangeable novel anvil fixtures, and an adjustable support system therefor, to adapt the machine for the assembly of arcuate brake shoe components of different predetermined sizes.

Other features and advantages will hereinafter appear.

In the drawing:

FIG. 1 is a perspective of the machine of the present invention.

FIG. 2 is a side view of a drum brake shoe assembly, partly in section.

FIG. 3 is a front view of a brake backing plate.

FIG. 4 is a front view of a corresponding friction pad.

Figure 5:
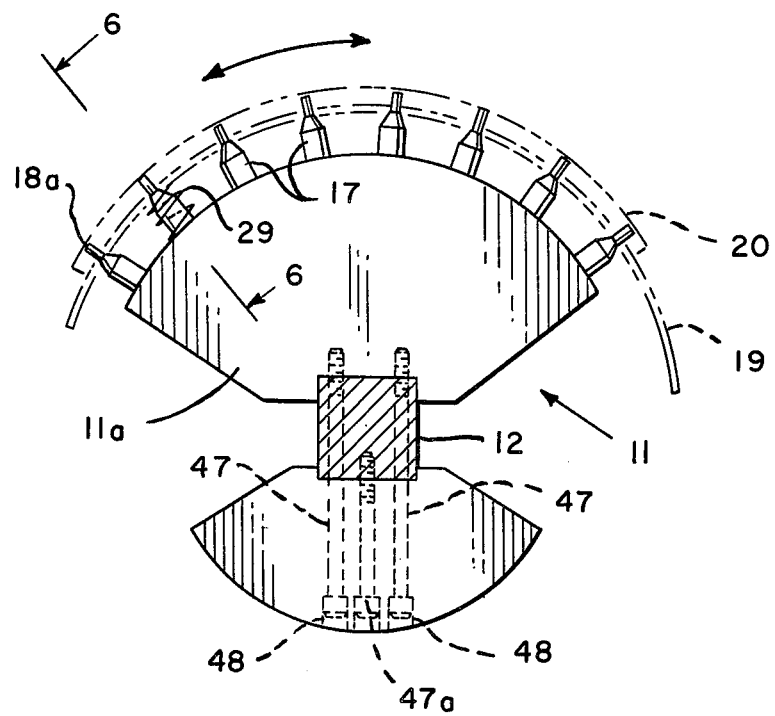
FIG. 5 is a side view of the arcuate fixture shown mounted on its shaft with a plate and pad being shown in dotted lines.
Figure 7:
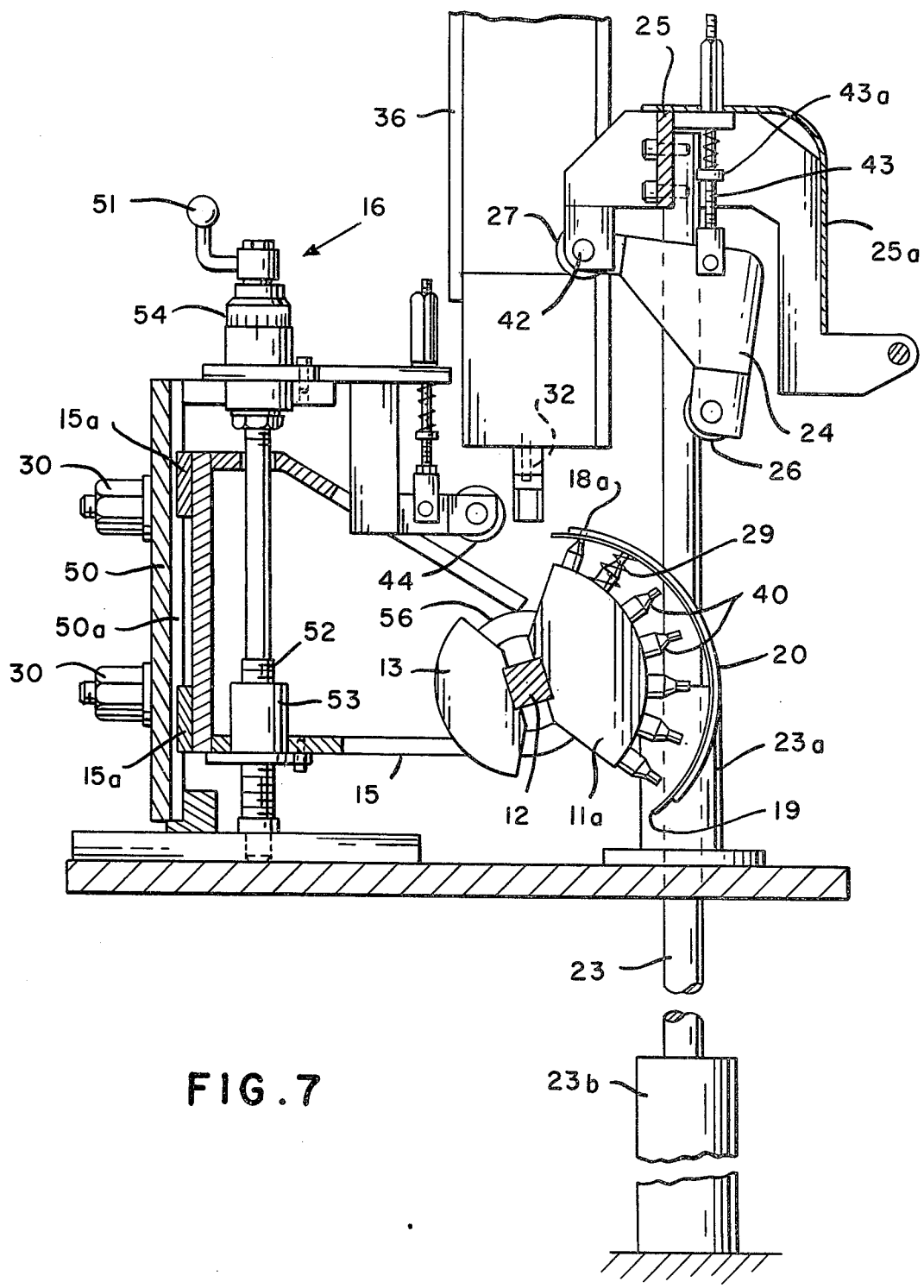
FIG. 7 is a section taken on the line 7—7 of FIG. 1, showing the relationship of the parts when a plate and pad are initially positioned on the fixture by the operator.

Referring to the drawing, the present apparatus 10 includes an anvil fixture 11, selected from a group of such fixtures of predetermined size corresponding to the size of the brake shoes being assembled, which is removably attached to a shaft 12 to be rotatively movable with respect to a pair of oppositely aligned, heretofore known, riveting machines. Also attached to the shaft, at the opposite side thereof, is a counterweight 13, as shown by FIGS. 5 and 7. The shaft 12 is connected by a coupler to the drive shaft of an incremental positioning motor 14 which is mounted adjacent the anvil fixture 11, all of these elements being supported by a vertically-adjustable carriage 15 which is attached to the apparatus and which is provided with precise adjustment means 16, shown in FIG. 7, for moving the carriage up or down precise distances to accommodate anvil fixtures of different predetermined sizes.

Figure 6:
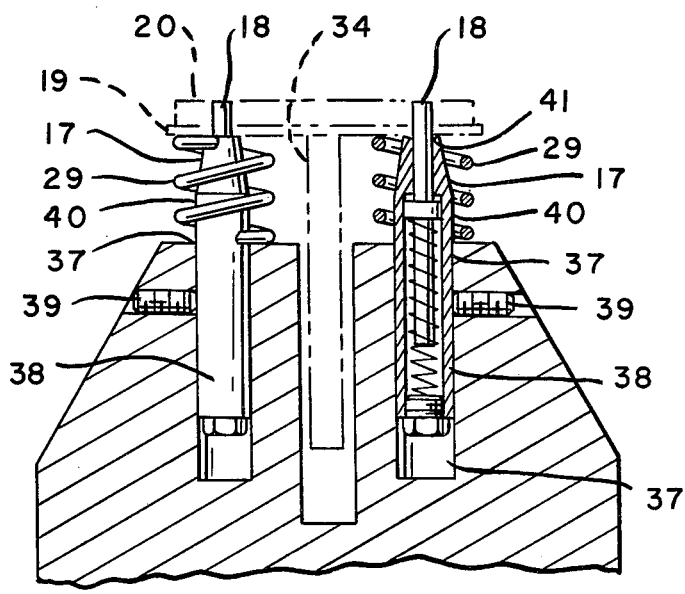
FIG. 6 is a partial transverse section of the fixture taken on the line 6—6 of FIG. 5, and enlarged to essentially full size.

The present anvil fixtures 11 are arcuate members which carry a predetermined plurality of radially extending anvils 17 at predetermined angles relative to one another, with each anvil terminating in a rivet roll set that includes an outwardly extending spring urged pin 18 that is depressible into the anvil. The anvils 17 are positioned on the fixture 11 to extend radially therefrom so as to be below each aligned hole of the brake shoe components in which a rivet is to be positioned when the components are in place on the anvil fixture, as shown by FIGS. 5 and 6.

Figure 8:
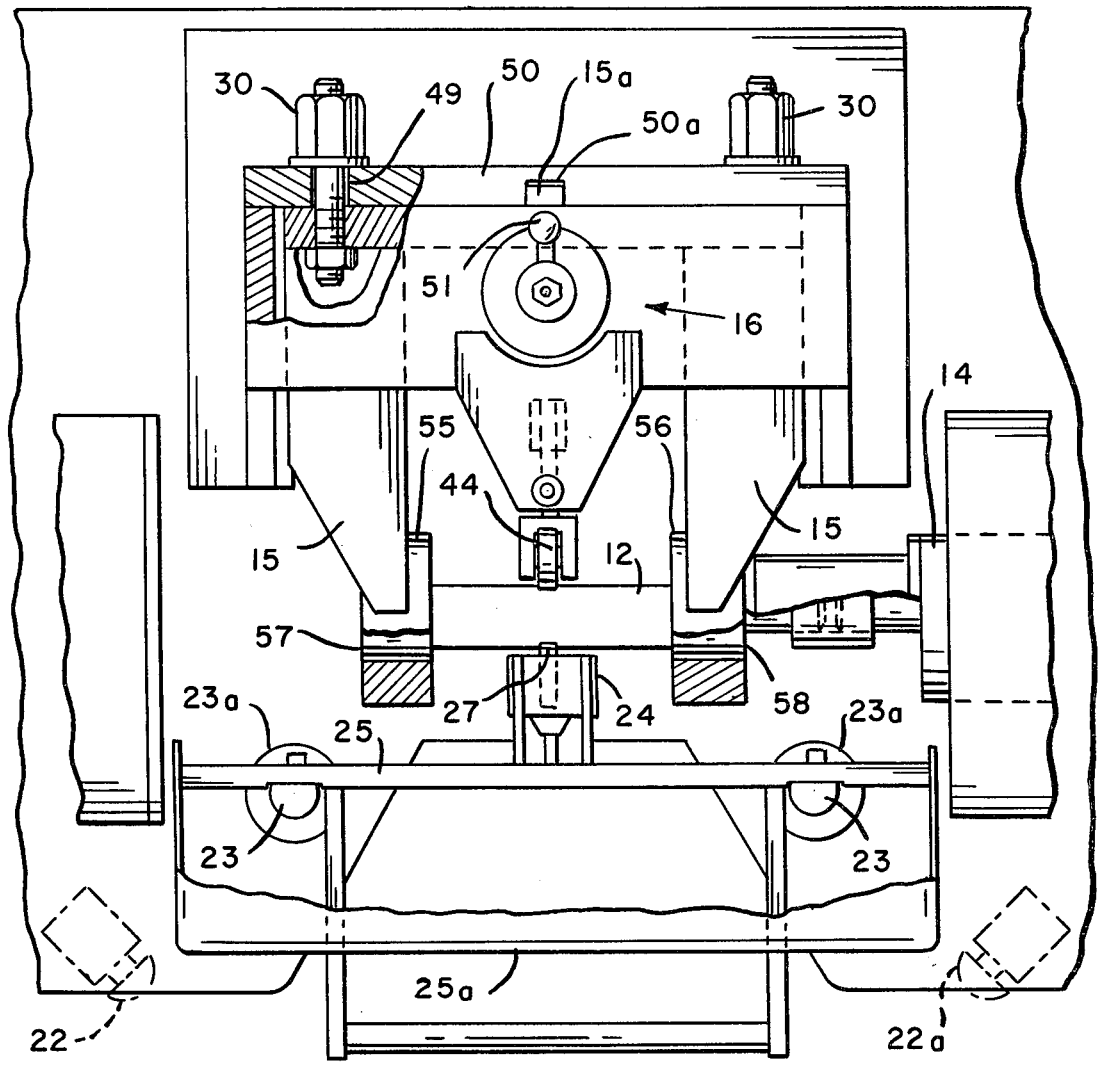
FIG. 8 is a top view of the present apparatus illustrating the anvil fixture-supporting carriage and frame.

In the operation of the apparatus, the anvil fixture 11 is initially located at a home or load position which enables an operator to position with one motion an assembly comprising an aligned brake shoe plate 19 and a friction pad 20 on an end pair of anvils 17 with the lead pins 18a thereof caused to project into the first common pair of aligned holes 19a and 20a at the lead end of the pad and plate, as illustrated by FIG. 7. At this point the operator withdraws his hands from the brake shoe components, attached to the anvil fixture, and activates dual, non-tie-down palm buttons 22 and 22a on the front of the apparatus, as shown in FIG. 8, to energize a pair of air cylinder rods 23 by means of pistons 23b within guide sleeves 23a and cause an guard assembly 25, attached roller element 24 and operator guard gate 25a supported by the rods 23 to move downwardly until the rollers 26 and 27 of element 24 engage the upper surface of the pad 20 and force the pad 20 and plate 19 to pivot on the supporting lead pins 18a against the non-engaged pins 18 until each of the holes in the plate and pad are aligned to allow the pins 18 to snap through the aligned holes and lock the brake shoe components in place on the anvil fixture 11, the plate rib portion 34 being received into the central radial slot 11b of the anvil fixture, as shown by FIG. 6.

The lead roller 26 initially moves the backing plate against the pins subsequent 18 of the anvil fixture 11 where there is interference, causing the subsequent pins 18 to become depressed. By continually forcing the plate against the pins, all the pins 18 (except the two initial lead pins 18a) are eventually depressed but only until they become aligned with the aligned holes 19a and 20a, at which time they spring outwardly to enter into the aligned holes and hold the plate 19 and pad 20 to the anvil fixture 11.

After the plate 19 and pad 20 are impaled on the pins 18, the anvil fixture 11 is indexed automatically, in accordance with the pre-set programmed operation of the motor 14, to position a median common pair of aligned holes beneath the upsetting tools of the riveting machines which are then actuated to insert and upset rivets 28 in each of the common pair of holes. The apparatus then sequences to index each common pair of holes into precise riveting position to effect the complete riveting operation. The machine subsequentially indexes the fixture 11 to its home position wherein the rods 23 are retracted to lift the guard assembly 25 and its attached roller element 24 out of engagement with the brake shoe. The release of roller pressure from the assembled brake shoe causes the shoe to be ejected from the anvil fixture 11, due to the presence of ejector springs 29 around the second lead pair of anvils 17, as shown by FIGS. 5 and 6.

As mentioned supra, the anvil fixture 11 is removably attached to the shaft 12, such as by means of bolts 30 shown in FIG. 5, to permit the interchange of anvil fixtures of different sizes to adapt the machine for the assembly of drum brake shoes of different sizes or diameters and having different numbers of rivet holes in different locations thereon. This requires that the shaft 12 supporting the anvil fixture 11 is adjustable vertically to accommodate larger and smaller diameter fixtures 11, and that the upsetting tools 31 and 32 are adjustable horizontally, a feature present in conventional dual riveting machines, to accommodate the different spacing between aligned pairs of rivet holes in brake shoes of different sizes, and that the indexing of the shaft 12 by the motor 14 is adjustable to rotate the anvil fixture to pre-set stop positions corresponding to the number of pairs of holes in the particular brake shoe components being assembled and the spacing between the holes along the length of the shoe.

The preferred mode of operation of the present apparatus is to index the anvil element to a median pair of aligned holes for the placement of the first pair of rivets therein, followed by the indexing to successive pairs of holes in one direction and finally the indexing to successive pairs of aligned holes on the other side of the median pair to complete the assembly. This procedure corresponds to that previously carried out manually in prior-known machines. However, it should be understood that since the pad and plate are locked onto the anvil fixture 11 by means of the pins projected through each of the aligned holes therein and at angles relative to each other, the sequence of the indexing steps is immaterial and may be varied by presetting the desired sequence of stop positions in the control circuit for the incremental motor 14. Such motors and control circuits are well-known in the art and reference to U.S. Pat. Nos. 3,241,017, 3,280,395 and 3,466,517 is incorporated herein as illustrative.

The machine of the present invention is generally indicated by the reference numeral 10 and is employed to automatically insert and upset rivets 28 into a drum brake shoe assembly. In the heretofore assembly of brake shoes, a pair of opposite facing riveting machines has been employed with both being used in the present machine 10 and indicated by the reference numerals 35 and 36. The present invention involves the replacement of the prior-known, single pin anvils with an indexing, ulti-pin anvil fixture.

The brake shoe assembly includes an aligned steel backing plate 19 and a friction pad 20 with each being formed with holes 19a and 20a, respectively, in which the rivets 28 are secured to form the final brake shoe, illustrated by FIG. 2. The backing plate 19 has a semi-cylindrical surface forming portion 33, in which the holes 19a are formed, and a support rib 34 extending inwardly therefrom, as shown by FIG. 2. The rib 34 may take any desired shape and the portion 33 may have any one of a plurality of diameters and number of holes of different spacing. The friction pad 20 is generally molded of asbestos material to have a curvilinear shape that matches that of the plate portion 33, as illustrated by FIG. 2.

The holes 19a and 20a are essentially evenly spaced along opposite side edges of the plate and pad respectively, with a pair of holes opposite to each other being called a pair of transverse holes as, for example, holes 19b and 19c of the plate 19, and holes 20b and 20c of the pad 20, as shown by FIGS. 3 and 4. The riveting machines 35 and 36 are both pre-adjusted to a position to simultaneously each insert a rivet 28 in one of the pair of aligned transverse holes 19b, 20b and 19c, 20c respectively, and then upset the rivet so that each riveting operation upsets two rivets simultaneously in a pair of transverse holes.

Figure 9:
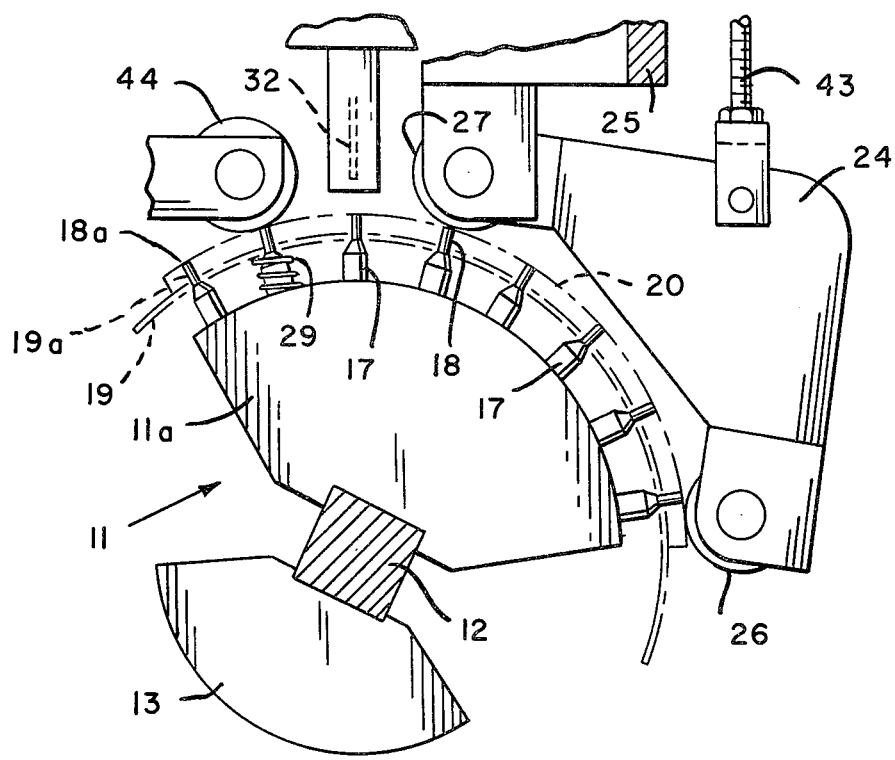
FIG. 9 is a sectional view similar to FIG. 7, showing the securement of one pair of rivets when the anvil fixture is at an index position.
Figure 10:
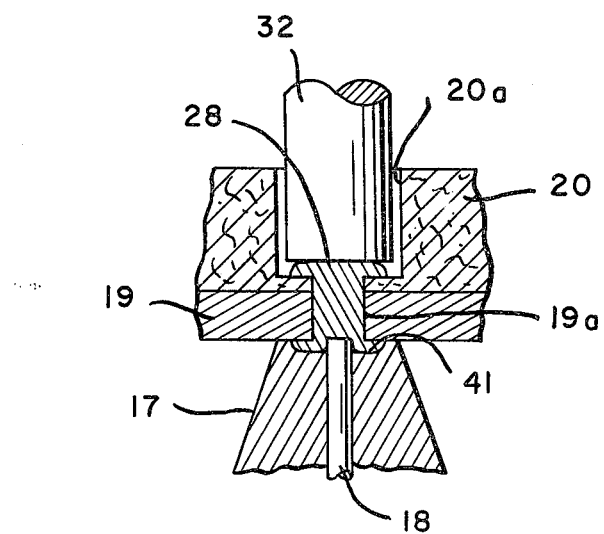
FIG. 10 is a detail of an upset rivet and its associated anvil element and upsetting tool.

Each riveting machine is of the type conventionally used for manual loading and manual re-positioning of the shoe components, except that the single fixed anvil attached to each machine, each carrying a single roll pin, is replaced with the novel multi-anvil fixture 11 of the present invention. In accordance with the present invention, a shaft 12 mounted for rotation on the machine 10 carries a semi-circular anvil fixture 11 with the fixture 11 carrying an anvil 17 for each rivet that is to be inserted. As more specifically shown in FIGS. 5 and 6, for each anvil 17 the fixture 11 is formed with a radial hole 37 for said anvil 17 with the latter being secured in the hole by a set screw 39. Each anvil 17 includes an outer shell 40 which contains a spring urged pin 18. The pin 18 has a projection portion 18b while the shell end 41 adjacent the pin is inwardly curved, as shown by FIG. 6, in order to form the upset in the end 28a of the rivet, illustrated by FIG. 9.

The projecting portion of the pins, as diagrammatically shown in FIG. 6, extends through the holes 19a and 20a of the backing plate 19 and friction pad 20 respectively, when the assembly is positioned on the fixture 11 with the back surface of the plate portion 33 abutting the end 41 of the shell 40, sometimes within the rivet hole if the hole is enlarged to accommodate the upset end of the rivet.

As the pins 18 fit quite closely within the holes, and as the pins are radially disposed and spread over a substantial area, an operator, placing an aligned plate 19 and pad 20 on the fixture 11 cannot force the aligned plate and pad on the fixture so as to have all projecting portions fit into the holes 19a and 20a. In accordance with the operation of the present machine, the operator merely places the aligned plate 19 and pad 20 on the first two aligned pins or lead pins 18a so that the projecting portions 18b enter both transverse lead holes and hold the plate 19 and pad 20 on the fixture 11. As shown in FIG. 6, the remainder of the plate 19 and pad 20 are spaced from the fixture 11 due in part to the presence of the ejector springs 29 around the second pair of anvils 17. Further as will be noted in FIG. 7, the shaft has been positioned so as to have the fixture 11 at a home position wherein the first two transverse holes or lead holes are located at the forward part of the machine ahead of the upsetting tools 31 and 32 of the riveting machines 35 and 36.

The operator then initiates downward movement of the guard assembly 25 by depressing the spaced palm buttons 22 to activate the air cylinder rods 23. The guard assembly 25 has pivoted thereto as by a pivot pin 42, an L-shaped roller element 24 which carries a lead roller 26 and a top roller 27 with the pivot pin 42 also serving to support the top roller 26. The roller element 24 is biased clockwise by a limited movement spring mechanism generally indicated by the reference numeral 43 so that as the air cylinder pistons 23b pull rods 23 and the attached guard assembly 25 down, the lead roller 26 initially engages the outer surface of the pad 20 at approximately the mid-point thereof. However, this initial engagement is merely utilized to maintain the plate 19 and pad 20 in position on the pins 18.

Further downward movement pivots the roller element 24 against the action of its spring 43 until a limit stop 43a is encountered, at which time the lead roller 26 is slightly above the axis of the anvil fixture shaft 12. The completion of the downward movement causes the roller 26 to exert a radial force on the pad 20 toward the fixture shaft 12 while the top roller 27 engages and exerts a downward radial force on the pad 20. The forces are sufficient to cause the backing plate 19 where it engages a pin 18 to depress each pin 18 inwardly into its shell 40 to enable the pad 20 to abut against the plate 19 throughout the length thereof. The pins 18 will then become aligned with the holes 19a and 20a and snap outwardly to project into said holes to povitively hold the plate 19 and pad 20 on the anvils 17 of anvil fixture 11.

Upon completion of the downward movement of the guard assembly 25, the motor control circuit is actuated to cause the fixture shaft 12 to turn to position a median pair of transverse aligned holes 19a and 20a in alignment with the punch elements 31 and 32 of the rivet machines. It should be noted that as shown in FIG. 8, a limited movement, spring-urged pivot roller 44 positioned behind the rivet machines will engage the pad 20 so that the pad is forced against the fixture 11 on both sides of the upsetting tools 31 and 32 of the riveting machines.

At this first riveting position, the rivet machines 35 and 36 are actuated to insert and upset rivets 28 in the aligned transverse median holes. Upon completion of this riveting operation, the fixture shaft is indexed automatically to sequentially position subsequent holes in alignment for rivet insertion and upsetting. The order of insertion is unimportant since the pad and plate are held together at all times by the pins 18 and since the operator's hands are away from the riveting station depressing the palm buttons 22.

The interchange of anvil fixtures 11 and, if necessary, counterweights 13 is made possible by the presence of attachment bolts 47 which are present in holes 48 countersunk into the rear of the counterweight 13 and pass through bores in the square anvil shaft 12 to engage threaded openings in the rear of the anvil fixture 11, as illustrated in FIG. 5. The number of bolts 47 may be varied and separate bolts 47a for the counterweight 13 may be provided as shown, if desired. The function of the counterweight 13 is to balance the weight of the anvil fixture 11. The different anvil fixtures 11 generally have different weights, depending upon their size or diameter relative to the center of the anvil shaft 12, thereby necessitating the use of companion counterweights having the same weight. However, the anvil fixtures 11 may be made so as to have the same weight regardless of differences in size, such as by using different metals in the fixture base 11a in which the pin roll shells 40 are mounted.

When a new anvil fixture 11 is attached to the anvil shaft 12, as discussed above, the vertical position of the shaft 12 relative to the upsetting tools 31 and 32 of the riveting machines 35 and 36 must be adjusted to a predetermined precise location, up or down, depending upon the relative diameters of the anvil fixtures 11 being interchanged.

This is accomplished by loosening the bolts 30 which pass through vertical slots 49 in the rear wall of the carriage-supporting frame 50 and threadably engage the rear wall of the carriage 15. This frees the engagement between the frame 50 and carriage 15 so that the position of the carriage 15, having upper and lower key elements 15a engaged within vertical track 50a of frame 50, can be adjusted to a precise predetermined known position by means of the calibrated adjustment means 16, as shown in FIGS. 7 and 8. The adjustment means 16 comprises a lever 51 attached to a partially threaded shaft 52 journaled into the frame 50 and which is threadably engaged by threaded sleeve 53 attached to the base of carriage 15. Rotation of shaft 52 by the lever 51 causes the carriage 15 to travel up or down within track 50a to a predetermined position indicated by the calibrated dial members 53 and 54 fixed to the lever 51 and the top of the frame 50, respectively. When the new carriage position is set, the bolts 30 are retightened to lock the carriage 51 to the frame 50.

As also shown by FIGS. 7 and 8, the carriage-supporting frame 50 also supports the spring-biased rear roller 44 in fixed position relative to the riveting station, since the adjustment of the position of the anvil fixture-supporting shaft 12 always presents the loaded brake shoe components at the same riveting height, regardless of differences in the size thereof, for engagement with the rear roller 44 and the rollers 26 and 27 of the roller element 24.

The carriage element 15 rotatively supports the anvil shaft 12 by means of bearing housings 55 and 56, respectively, shown in FIG. 8, which are attached to the carriage 15 and which contain bearings 57 and 58 respectively, attached to the anvil fixture-supporting shaft 12 for free rotation within the housings 55 and 56. Since the indexing motor 14 merely functions to move the anvil fixture from one riveting position to another and eventually to the load position, shown by FIG. 7, the size and weight of the motor 14 is easily supported by means of coupling 14a attached to bearing housing 56, as shown by FIG. 8.

Figures 11, 12:
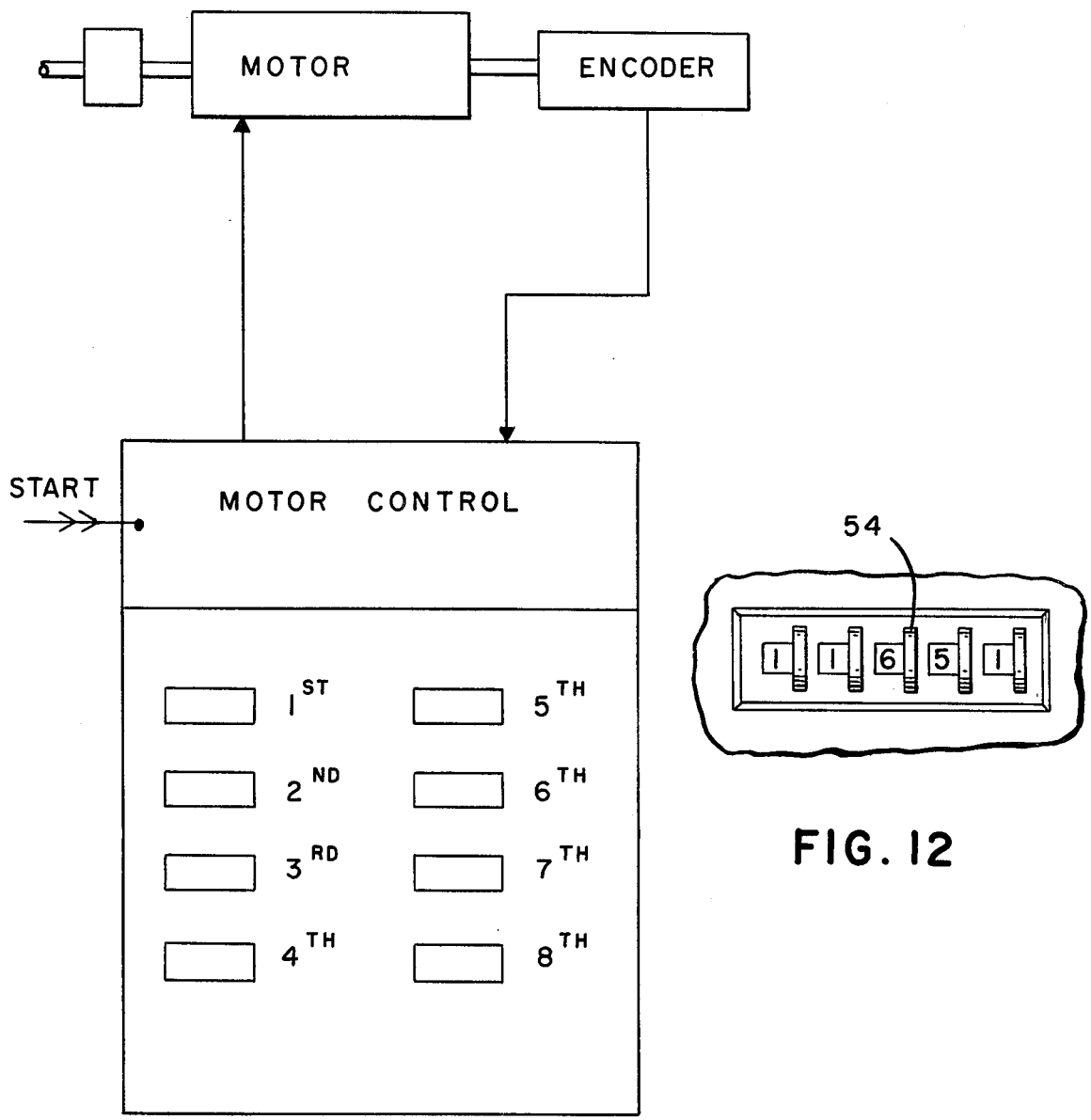
FIG. 11 is a block diagram of a control scheme for the operation of the machine of the present invention.
FIG. 12 is an enlarged view of the position setting units of the console shown in FIG. 11.

The indexing of the shaft 12 is effected by the incremental positioning motor 14 which, as mentioned, is also mounted on the adjustable carriage 15 with its drive shaft connected directly to the anvil fixture shaft 12. Referring to FIG. 11, the motor 14 has a position encoder associated with its drive shaft to provide signals of the instantaneous position of the shaft. The motor is energized by a motor control which receives the signals from the encoder and also signals from a console. The console has a plurality of position-adjusting units, specifically 8, indicated by the positions 1st through 8th.

Each unit, as shown in FIG. 12, includes a plurality of settable thumb wheels 54, each associated with a readout window 46, showing the numerical setting representing the encoder signal for that position. The operator sets each unit to the encoder signal needed for that index position, thus enabling the shaft position to be accurately assumed within the 0.002 inches alignment of the roll set with the upsetting tools of the rivet machines needed to precisely set the rivet.

The motor, encoder, console and motor control are commercially-available from Industrial Indexing System, Inc., Victor, N.Y. Generally a plurality of other controls, not shown herein, are provided for operating the motor.

As discussed supra, the present apparatus is programmable to accommodate the use of different interchangeable anvil fixtures having different numbers of roll sets spaced at different distances and angles relative to each other to accommodate the assembly of different arcuate brake shoes. Since the number and spacing of the rivet-receiving holes is standard for each size of arcuate brake shoes and differs only from one size to another, the present encoder signal settings can be pre-set on the thumb wheel units to provide sequential stop signals to the motor representative of the exact number and location of rivet-receiving holes in the brake shoe components loaded on the anvil fixture. No change in such settings is required, unless a new anvil fixture of different size is substituted for the prior anvil fixture, as is required if the apparatus is to be changed over for the assembly of brake shoes of a different size. If this is done, the thumb wheel settings are adjusted to provide new signal positions represented by predetermined known numerical combinations displayed in the windows 46. If the brake shoe being assembled has a lesser number of pairs of rivet-receiving holes, i.e., four or six, the unnecessary position-indicating thumb wheel units are deactivated so that the encoder signals the motor to return to the load position after the final pair of rivets has been placed and upset.

Variations and modifications of the present invention will be apparent to those skilled in the art within the scope of the present claims.

I claim:

1. An apparatus for loading, positioning and riveting arcuate brake shoe components comprising a base plate and friction pad, comprising an anvil fixture carrying a plurality of radially-extending anvil elements, each anvil element comprising a rivet-setting end and a depressible alignment pin, the rivet-setting ends of said anvil elements defining a segmented arcuate surface adapted to receive said brake shoe components for assembly, said anvil elements being aligned on said anvil fixture so that when the alignment pin of the leading anvil element is inserted into the leading pair of aligned holes in a plate and pad to be assembled, the alignment pins of successive anvil elements will be aligned with and enter the successive aligned holes of the plate and pad when said plate and pad are pushed into engagement with said segmented arcuate surface, thereby locking said plate and pad onto said anvil fixture, means for rotating said anvil fixture, at least one riveting machine having a riveting head in the path of rotation of said fixture, means for relatively rotating said fixture to bring each said anvil element into riveting position beneath said riveting head, and means for actuating the riveting machine to cause an upset rivet to be positioned and set in the aligned holes of a plate and pad mounted on said anvil fixture.

2. The invention as defined in claim 1 in which the aligned holes form common pairs that are axially aligned along the axis of the fixture, in which there are two riveting machines that are mounted to be aligned axially along the axis of the fixture and having their riveting heads spaced a distance apart equal to the distance between a common pair of holes and in which the means actuating the riveting machines includes means for actuating both riveting machines simultaneously.

3. The invention as defined in claim 2 in which the common pairs of aligned holes are located along the length of the plate and pad, in which one of said common pairs is a median pair and in which the means for rotating the anvil fixture causes the median pair to be the first of the common pairs to be positioned in alignment with the riveting heads to have upset rivets positioned therein.

4. The invention as defined in claim 3 in which the means for rotating the fixture is adapted to rotate the fixture so that common pairs of aligned holes, from the median pair to one end, are sequentially positioned in alignment with the riveting heads.

5. The invention as defined in claim 4 in which the means for rotating the fixture is adapted to rotate the fixture so that common pairs of aligned holes, from the median pair to the other end, are sequentially positioned in alignment with the riveting heads.

6. The invention as defined in claim 1 in which there are means for pushing a pad and plate, attached to said fixture, against the ends of said anvil elements to cause the retainer pins of the successive anvil elements to enter into their respective aligned holes in the plate and pad.

7. The invention as defined in claim 6 which includes means for applying inwardly directed essentially radial force to essentially the middle of a pad superposed over a plate on said fixture.

8. The invention as defined in claim 7 in which the apparatus includes a guard assembly overlaying the anvil fixture and mounted for movement essentially tangential to the anvil fixture and in which the means for applying essentially radial force includes a roller means attached to said assembly.

9. The invention as defined in claim 1 in which said anvil fixture also comprises an ejecting means adapted to eject the assembled brake shoe therefrom when the riveting operation is completed.

10. The invention as defined in claim 1 which comprises a shaft supporting said anvil fixture, means for removably attaching said anvil fixture to said shaft and a plurality of said anvil fixtures of different sizes adapted for interchangeable attachment to said shaft for the assembly of arcuate brake shoe components of different sizes.

11. The invention as defined in claim 10 comprising means for adjusting the position of said shaft relative to the riveting head of the riveting machine to accommodate the use of anvil fixtures of different diameters on said shaft.

12. The invention as defined in claim 10 or 11 in which said shaft is connected to an incremental positioning motor and said motor, shaft and anvil fixture are supported by a carriage element which is adjustably mounted relative to the riveting head of said riveting machine.

13. The invention as defined in claim 1 in which the means for relatively rotating the anvil fixture comprises an incremental positioning motor which is adapted to automatically rotate the fixture to each said riveting position in sequence and to a final shoe-removal position.

14. The invention as defined in claim 13 in which said anvil fixture is supported by a rotatable shaft which is connected to said incremental positioning motor and said motor, shaft and anvil fixture are supported by a carriage element which is adjustably mounted relative to the riveting head of said riveting machine.

15. The invention as defined in claim 1 which comprises means for pressing a plate and pad, locked onto said anvil fixture during assembly, into intimate surface contact with each other during the riveting operation.

16. The invention as defined in claim 1 in which said anvil fixture is supported by a rotatable shaft, said shaft is connected to an incremental positioning motor and said motor, shaft and anvil fixture are supported by a carriage element which is adjustably mounted relative to the riveting head of said riveting machine.

17. The method for applying rivets into aligned holes of arcuate brake shoe components, comprising a backing plate and a friction pad, to form an assembled brake shoe comprising the steps of supporting an anvil fixture for rotation beneath the head of a riveting machine, said fixture carrying a plurality of radially-extending anvil elements corresponding in number and position to the number of aligned holes of said brake shoe components, the ends of said anvil elements defining a discontinuous arcuate surface corresponding to the arcuate undersurface of said backing plate, attaching said pad and backing plate against said arcuate surface with each of said aligned holes aligned with the end of an anvil element, and rotating said anvil fixture and attached pad and plate through a sequence of riveting positions to insert and upset a rivet in each of said aligned holes to form said assembled brake shoe.

18. The method according to claim 17 in which said pad and plate are attached to said arcuate surface by providing each of said anvil elements with a depressible retainer pin which extend radially through said aligned holes of said pad and plate pressed against said arcuate surface to attach said brake shoe components to said anvil fixture.

19. The method according to claim 18 in which said pad and plate are loaded onto said arcuate surface by positioning a lead pair of said aligned holes over a lead pair of anvil elements with the pins thereof extending through said holes, and thereafter applying radial pressure against said pad and plate to cause the undersurface of the plate to depress the other pins into their anvil elements until the aligned holes are aligned with their respective anvil elements to permit each of said pins to extend through a pair of aligned holes.

20. The method according to claim 17 in which said assembled brake shoe is automatically ejected from said anvil fixture after the riveting process is completed.

21. The method according to claim 17 which comprises providing a plurality of anvil fixtures of different predetermined sizes for the assembly of brake shoes of different predetermined sizes and interchanging said anvil fixtures to correspond to the size of the brake shoes being assembled.

22. The method according to claim 17 or 21 in which the rotation of the anvil fixture through said riveting positions is adjustably controlled to correspond to the number and location of the ends of the anvil elements present on said anvil fixture.

* * * * *